March 20, 1928.

S. M. DICK 1,663,158

VARIABLE SPEED TRANSMISSION MECHANISM

Filed Nov. 30, 1925   2 Sheets-Sheet 1

INVENTOR.
Samuel M. Dick
BY
ATTORNEY.

March 20, 1928.
S. M. DICK
1,663,158
VARIABLE SPEED TRANSMISSION MECHANISM
Filed Nov. 30, 1925  2 Sheets-Sheet 2
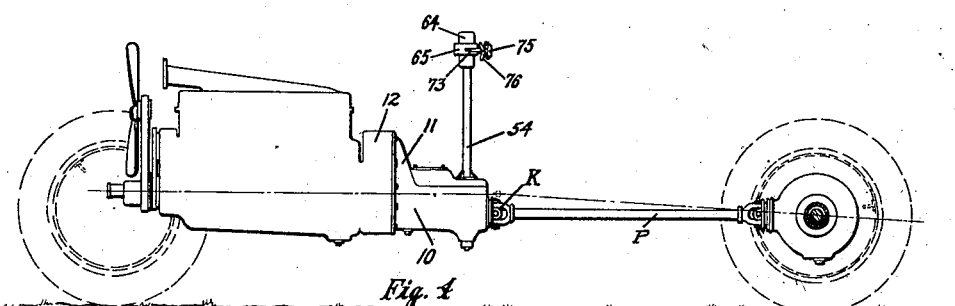
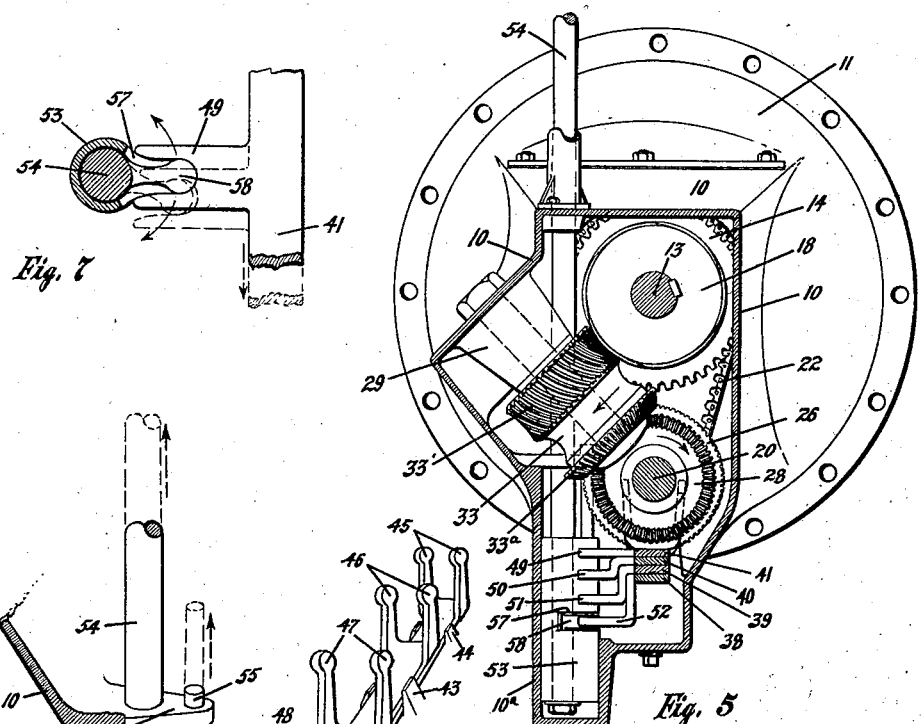
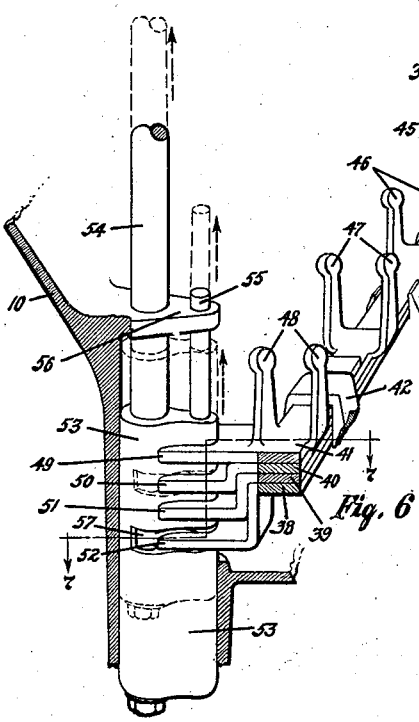
INVENTOR.
Samuel M. Dick,
BY
ATTORNEY Patented Mar. 20, 1928.

1,663,158

UNITED STATES PATENT OFFICE.

SAMUEL M. DICK, OF PASADENA, CALIFORNIA, ASSIGNOR OF ONE-HALF TO H. H. WARD.

VARIABLE-SPEED TRANSMISSION MECHANISM.

Application filed November 30, 1925. Serial No. 72,122.

My invention relates to variable speed transmission mechanism, and it has among its salient objects to provide a transmission mechanism which will be as nearly noiseless as possible when in operation at any speed; to provide such a transmission mechanism having provision not only for a plurality of different speeds forwardly, but also having provision for a plurality of different speeds backwardly of the vehicle driven; to make possible and practicable the use of a plurality of worm gear drives, said worms and gears being constantly in mesh, with clutch mechanism for selectively connecting the particular drive desired; to provide in a mechanism of the character referred to a simple, compact and practical combination of cooperating elements for accomplishing the desired results.

In order to explain my invention, I have illustrated on the accompanying two sheets of drawings one practical embodiment thereof, which I will now describe.

Figure 4 is a side elevation of my transmission mechanism in connection with a motor and the propeller shaft of a vehicle;

Figure 5 is a vertical sectional view through a transmission case, taken on line 5—5 of Fig. 1;

Figure 6 is a perspective view of the clutch mechanism removed from the transmission case; and Figure 7 is a view, partly in section, in line 7—7 on Fig. 6.

Figures 1, 2, 3:
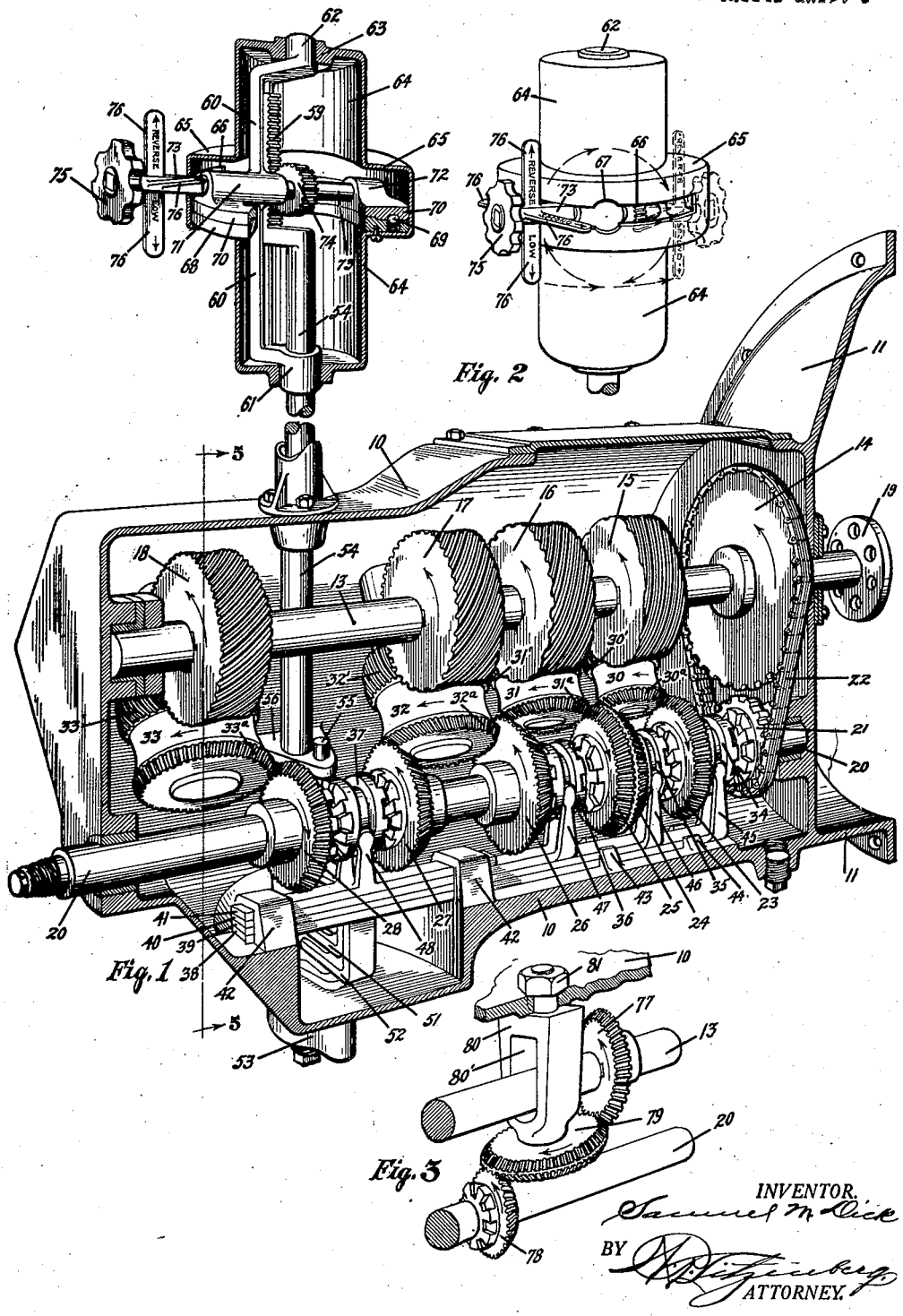
Figure 1 is a sectional, perspective view through a transmission case, showing my improved variable speed mechanism therein.
Figure 2 is a side elevation of the selective control mechanism, shown in section in connection with Fig. 1.
Figure 3 is a modified form of direct drive connection which can be substituted for the chain direct drive in the end of the transmission case as shown in Fig. 1.

Referring now in detail to the drawings, I will describe the embodiment of my invention shown for illustrative and descriptive purposes, referring first to Fig. 1. A transmission case or housing 10, is provided at one end with an enlarged portion 11, adapted to be secured to a fly wheel housing, designated, 12, Fig. 4. Within said transmission case, 10, is a drive shaft, 13, provided with a sprocket wheel 14, and with the worms, 15, 16, 17 and 18, all secured to turn with said shaft. The outer end of said shaft is provided with means, 19, for connecting it with the engine. Mounted in the transmission case, 10, is a transmission shaft, 20, having mounted thereon a clutch sprocket, 21, connected by means of a sprocket chain, 22, with a sprocket wheel, 14. There is also mounted on said transmission shaft, 20, clutch gears, 23, 24, 25, 26, 27 and 28, all mounted to turn freely on said transmission shaft. Mounted in said transmission case 10, as shown more clearly in Fig. 5, in bearing supports, as 29, are worm gear spools 30, 31, 32 and 33, having worm gears, 30', 31', 32' and 33', at their upper ends, in mesh, respectively, with the worms 15, 16, 17 and 18, and at their lower ends, said worm gear spools are provided with beveled gears, as 30$^a$, 31$^a$, 32$^a$ and 33$^a$, the beveled gear 30$^a$ being in mesh with the clutch gears 23 and 24; the beveled gear 31$^a$ being in mesh with the clutch gears 25 and 26; the beveled gear 32$^a$ being in mesh with the clutch gear 27; and the beveled gear 33$^a$ being in mesh with the clutch gear 28, as shown in Fig. 1.

From the description thus far, it will be understood that the drive shaft, 13, and the worms, 15, 16, 17 and 18, keyed thereto, drive the worm gear spools, 30, 31, 32, and 33, and that these in turn drive the clutch gears 23, 24, 25, 26, 27 and 28, on the transmission shaft 20, and that the sprocket wheel 14, through the sprocket chain 22, drives the clutch sprocket 21, on said transmission shaft 20.

Slidably keyed to said transmission shaft 20, are double clutch members, 34, 35, 36, and 37, adapted to be moved in either direction to connect, respectively, with the clutch sprocket 21, the clutch gears 23 or 24; the clutch gears 25 or 26; or with the clutch gears 27 or 28, depending upon the direction said clutch members 34, 35, 36 and 37 are moved.

I will next describe the mechanism shown for moving said clutch members. Four flat shift bars, 38, 39, 40 and 41, are shown, mounted one upon the other, in suitable guide members, 42, 42 and between pairs of guide lugs, 43 and 44, on the bottom of the transmission case, 10, as clearly shown in Fig. 1. Said shift bars are provided, respectively, with clutch shifting forks, 45, 46, 47 and 48, in operative engagement, respectively, with the clutch members 34, 35, 36 and 37. Said shift bars are also provided, in alinement with each other and one above the other, with operating forks, 49, 50, 51 and 52, shown in Figs. 6 and 7, and also in Fig. 1. These operating forks fit around a vertically movable member 53, mounted on the lower end of a vertical shaft 54, said member 53, being prevented from turning by means of a stub shaft, 55, the upper end of which slides through a bracket 56, shown as a part of the transmission case 10. Said member 53, is provided with a slot-like opening, 57, through its side, within which, on the shaft 54, is an operating finger, 58, clearly shown in Fig. 7. Said vertically movable member 53, can be moved vertically to position said slot 57, and the operating finger, 58, therein, opposite or in register with any one of the operating forks, 49, 50, 51 or 52, whereby when said shaft, 54, and said operating finger, 58, are turned in either direction, in a manner to be described, it will move that one of the operating forks, 49, 50, 51 or 52, with which said finger is in register in either direction a short distance, and thereby move its shift bar, and its clutch operating fork, as the case may be, and as will be clear from the showing made. This provides a selective mechanism for selecting and operating the clutch shift bars for selectively operating the clutch members in the manner hereinbefore referred to.

I will now describe the means for raising the member 53, to the different vertical positions and for operating the shaft 54, for moving the selected shift bar and its clutch operating fork.

Referring to Figs. 1 and 2, said vertical shaft 54, is extended upwardly to a desirable and convenient position for the driver, and is provided at its upper end with an off-set vertical rack 59, moving in a channel casting or member, 60, having its lower end 61, forming a bearing around said shaft, 54, and its upper end, 62, turning in a bearing, 63, in the upper end of a housing, 64, substantially as shown. Said housing is shown of cylindrical form, with an enlarged annular extension, 65, provided with a circumferentially extended slot, 66, in the middle part of which slot is a rounded portion 67. Mounted in said annular extension, 65, of said housing, 64, is an annular track casting, 68, with spring pressed lock balls, as 69, positioned to lock a top casting 70, turning thereon in different positions of adjustment, as hereinafter again referred to. Said top casting is provided with transverse bearings, 71 and 72, in which is a selective shaft, 73, having thereon a pinion 74, in mesh with said rack 59, the outer portion of said shaft, 73, being of angular form to fit in the slot, 66, in the annular extension so as not to turn therein, and provided on its outermost end with an operating hand wheel, 75, and with indicator vanes, 76, having thereon the words indicating the possible selections, whether, "Reverse", "Low", "First", "Second", "Third", "Fourth", or other speeds desired. The selections are made by moving the hand wheel, 75, and the shaft 73, to the middle rounded portion, 67, of the slot, 66, whereupon said shaft 73, can be turned as desired. This operates through the pinion, 74, and rack 59, to raise the vertical shaft 54, the desired distance, whereupon said hand wheel, 75, and said shaft, 73, can be swung in either direction in the slot, 66, to shift the selected clutch. This movement, as before stated, moves the top casting, 70, and the different positions, that is the movement to the left of said hand wheel 75 and shaft, 73, or to the right, or to neutral position at 67, are yieldingly held by the spring pressed balls, as at 69, before referred to, said top casting 70, having in its under side the proper depressions to receive the ball, as indicated.

In Fig. 3, I have shown a modified form for direct drive shaft, 13, to shaft 20, in place of the sprocket wheels and chain. This mechanism comprises a beveled gear 77, on the shaft 13, in place of the sprocket wheel, 14, and a clutch gear, 78, on shaft 20, in place of the clutch sprocket, 21, with a double beveled gear, 79 therebetween, said double gear, 79, being mounted on a support, 80, secured to the transmission case by means of a nut, 81, substantially as shown, and being adapted to have the shaft 13, pass through an opening 80' therein.

The forward drives are accomplished through the clutch gears 24, 26 and 27, and the reverse drives are accomplished through clutch gears 23, 25 and 28, as will be clear from the showing made in Fig. 1, and the direction indicating arrows on the various revolving parts. It will be understood, of course, that the worms, 15, 16, 17 and 18, and the worm gear spools, 30, 31, 32 and 33, and the clutch gears 23, 24, 26, 27 and 28, are all running in mesh with each other all the time the engine is operating, and that the selected drive, whether forward or reverse, is dependent upon the movements of the selected clutch members, 35, 36 or 37, and, if direct drive is desired, the movement of clutch member, 34, into the clutch sprocket, 21, is made. These clutch members are moved one way or the other by swinging the hand wheel, 75, and its operating shaft, 73, one way or the other from the neutral position, which is the rounded portion 67, of the guide slot 66.

The control mechanism is such that the control lever or shaft, 73, must always be moved to the central or neutral position, 67, before it can be moved to another position, or before it can be turned, as the angular, or square shaft, 73, cannot be turned except when at the neutral position. This necessitates the return of all parts to their normal or neutral positions before another selection and shift can be made.

Referring to Fig. 4, attention is called to the fact that the connection from the transmission shaft to the differential on the rear axle of the vehicle is in a straight line, that is, while there is a knuckle joint at K for connecting the transmission shaft 20, to the propeller shaft P, said propeller shaft is in alinement with the transmission shaft, whereas in the usual arrangement the line of connection is that indicated by the light broken line. This is made possible by reason of the fact that the drive is from the drive shaft 13, to the transmission shaft 20, and said transmission shaft is connected directly to the propeller shaft instead of having the driving connection returned to the alinement of the drive shaft, 13, as in the usual transmission.

While I have shown and described one practical embodiment of my invention, I am aware that changes in details and connections can be made without departing from the spirit of the invention, and I do not, therefore, limit the invention to the showing made for illustrative and descriptive purposes, except as I may be limited by the hereto appended claims.

I claim:

1. In a transmission mechanism, a housing, a drive shaft, a transmission shaft, a plurality of worms on one of said shafts, a plurality of gears on the other of said shafts, a plurality of intermediate elements having worm portions in mesh with said worms and gear portions in mesh with said gears, whereby said drive shaft and said transmission shaft are operatively connected by said worms, gears and intermediate elements, and a plurality of clutch elements for selectively operating one shaft from the other through said connections.

2. In a transmission mechanism, a housing, a drive shaft, a transmission shaft parallel therewith, worms on one of said shafts, worm spools mounted in said housing and each having a worm gear on one end and a beveled gear on its other end, beveled gears on the other shaft in mesh with the beveled gears on said worm spools, and clutch members on said second shaft and movable to connect the beveled gears thereon to turn therewith, and manually operable selective and operating mechanism for controlling the movements of said clutch members.

3. In a transmission, in combination, two parallel shafts, a worm on one shaft, a worm spool in said housing having a worm at one end in mesh with said worm and having a beveled gear at its other end, two beveled gears on said other shaft and both in mesh with the beveled gear on said worm spool and driven in opposite directions thereby on said second shaft, a clutch member between said beveled gears, on said second shaft, and operable to connect either of said beveled gears to turn said second shaft, and means for moving said clutch member to selectively connect said beveled gears to said second shaft.

4. In a transmission mechanism, a housing, a drive shaft therein, a transmission shaft therein, worms on said drive shaft, a worm spool for each worm, said worm spools having worm gears at one end of each and beveled gears at the other end of each, beveled gears on said transmission shaft in mesh with the beveled gears on said worm spools and driven thereby on said transmission shaft, clutch members on said transmission shaft between said beveled gears, said clutch members being slidably keyed to said transmission shaft and adapted to be moved selectively into mesh with said beveled gears, and means for selectively moving said clutch members for transmitting power from said drive shaft to said transmission shaft.

5. In a transmission mechanism, a housing, a drive shaft therein, a transmission shaft therein, a plurality of worms on said drive shaft, a plurality of worm spools supported in said housing and each having a worm gear in mesh with one of said worms and each having a gear thereon, gears on said transmission shaft in mesh with the gears on said worm spools, clutches on said transmission shaft, between the gears thereon and operable to selectively lock said gears to said shaft for driving the latter, and manual means for selectively operating said clutches.

6. In a variable speed transmission mechanism, in combination, a housing, two parallel shafts, a plurality of worms on one shaft, a plurality of worm spools mounted in said housing and each having at one end a worm gear and at its other end a gear, said worm gears being in mesh with said worms, a plurality of gears on the other shaft in mesh with the gears on said worm spools, said gears turning freely on said other shaft, double clutch members interposed between said gears on said other shaft and each being movable into interlocking engagement with either of the gears between which it is located on said other shaft, and manually operable selective mechanism for selectively operating said clutch members, said selective mechanism including shifting elements connected with said clutch members and movable in opposite directions, and means for manually operating the same.

7. In a variable transmission, in combination, a housing, two parallel shafts, a chain and sprocket drive from one to the other, a clutch therefor, a plurality of worm and gear drives between said shafts for selectively establishing different driving speeds therebetween, clutch means for selectively establishing said driving connections, and selective control mechanism for selectively operating said clutch means.

8. In a variable speed transmission mechanism of the character shown and described, in combination, a housing, two shafts therein, worms on one shaft, gears on the other shaft, separate intermediate members operatively connecting said worms with said gears continuously, said gears turning on their shaft, clutches slidably keyed to said shaft near said gears and adapted to lock said gears to said shaft, clutch operating means for each clutch, and means for selectively engaging and moving said clutch operating means, said latter means being manually operable, substantially as indicated.

Signed at Los Angeles, Los Angeles County, California, this 29th day of June, 1925.

SAMUEL M. DICK.